March 13, 1956  2,738,456
HANS-JOACHIM KLEINVOGEL ET AL
ELECTRIC CONTACT CONVERTERS
Filed Jan. 22, 1952  6 Sheets-Sheet 3

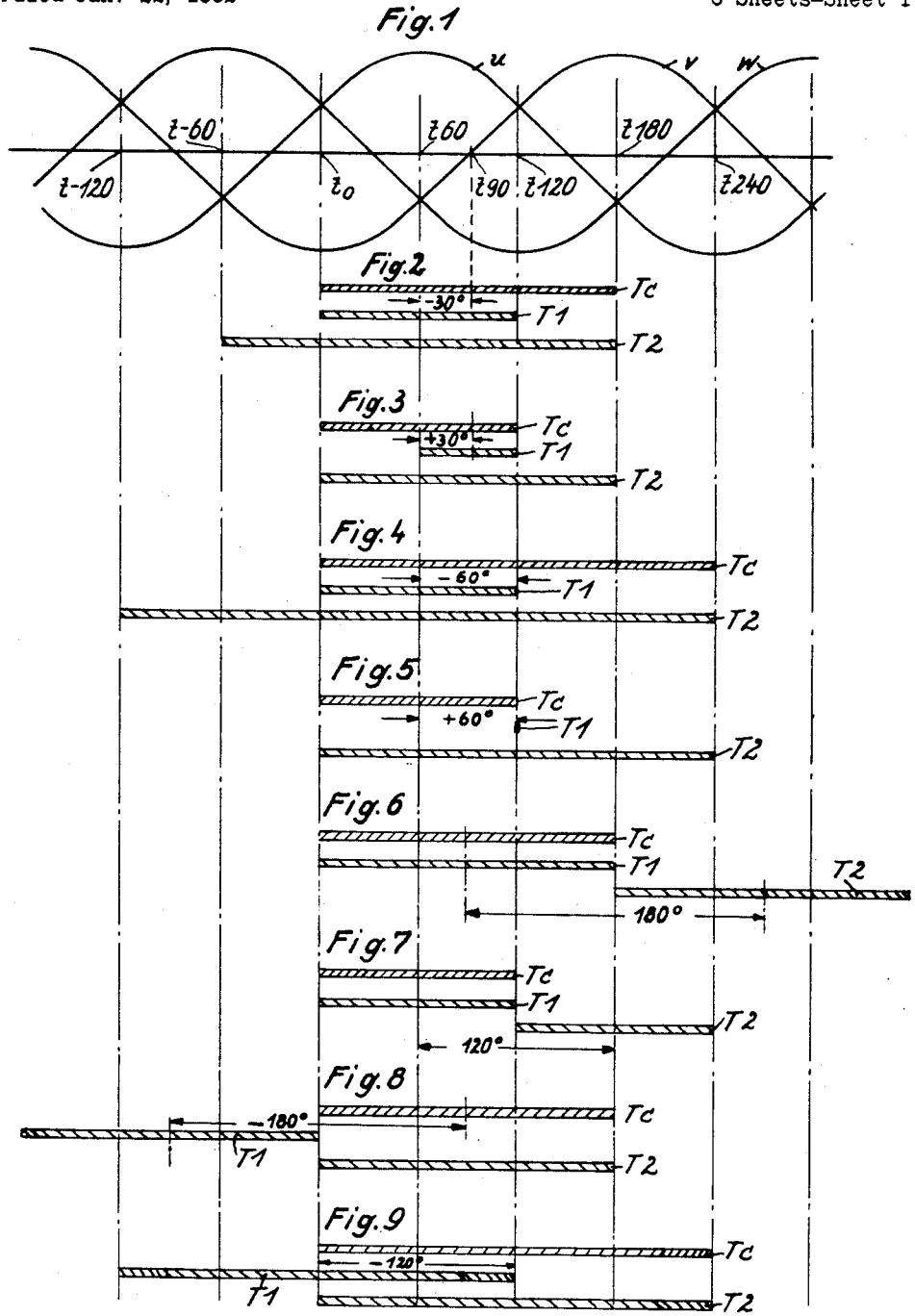

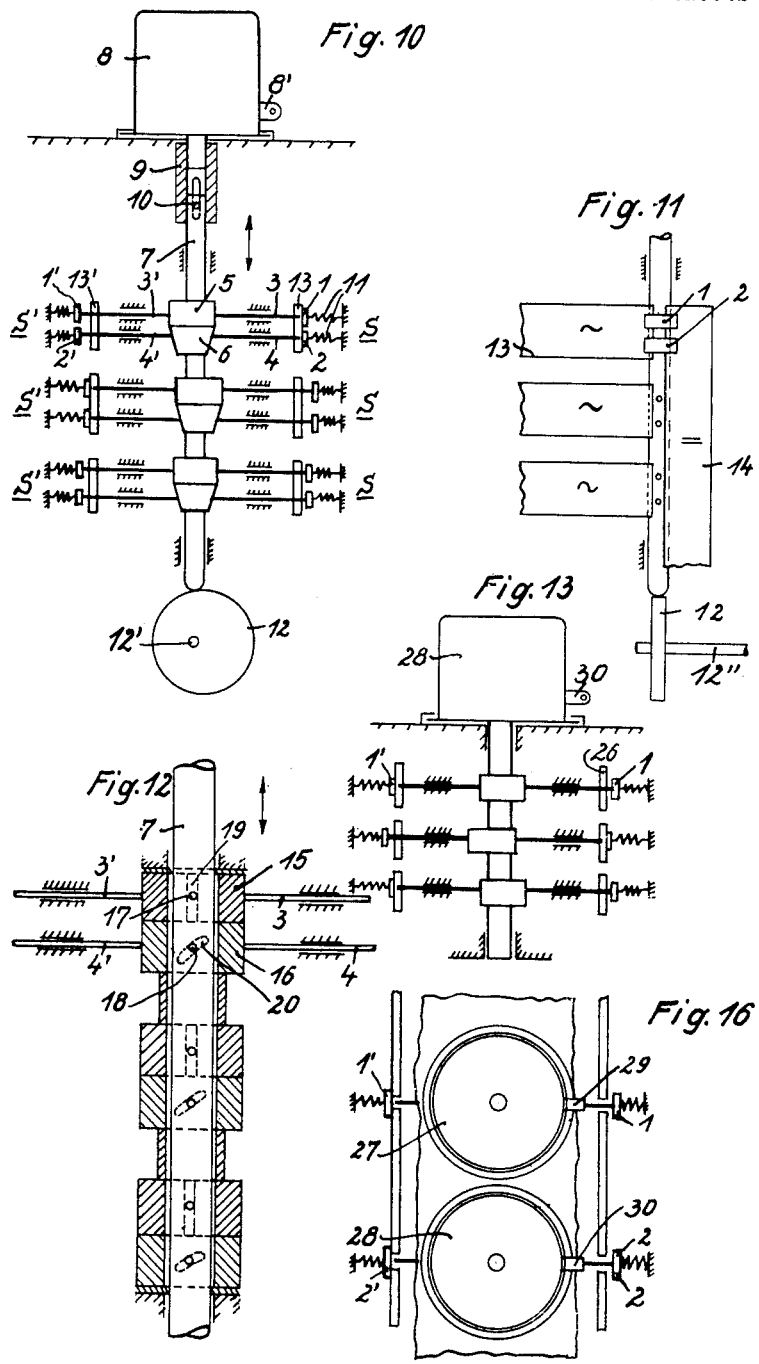

*Inventors*
HANS-JOACHIM KLEINVOGEL
FRITZ MÜLLER
BY C. M. Avery
ATT'Y

March 13, 1956
HANS-JOACHIM KLEINVOGEL ET AL
2,738,456
ELECTRIC CONTACT CONVERTERS
Filed Jan. 22, 1952
6 Sheets-Sheet 4
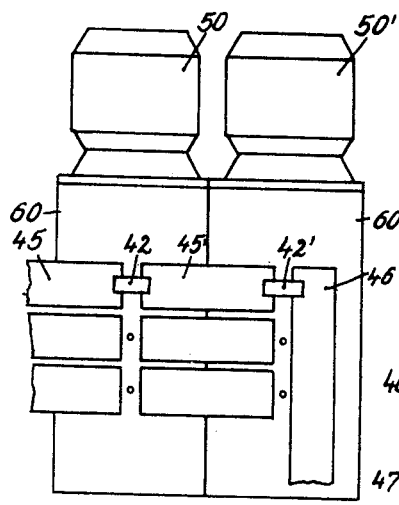
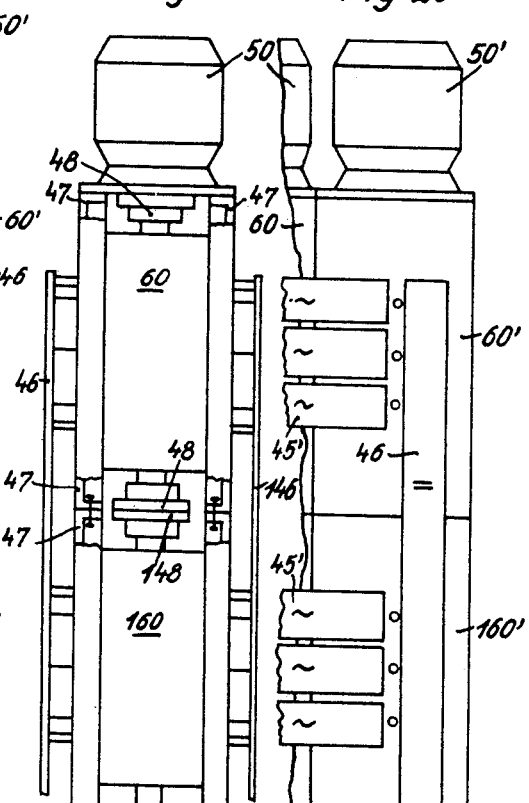
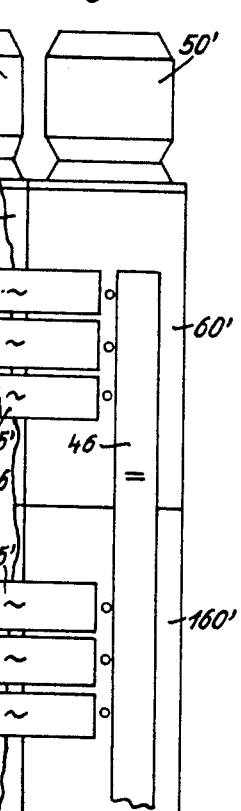
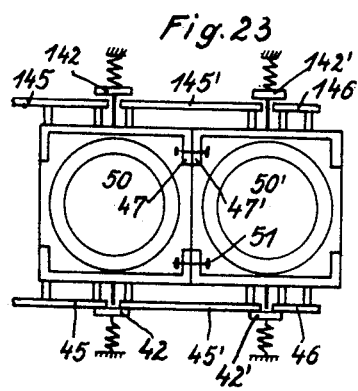
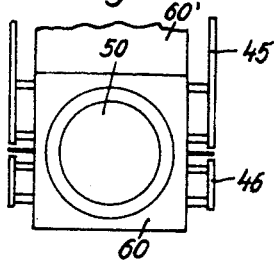
*Inventors*
HANS-JOACHIM KLEINVOGEL
FRITZ MÜLLER
BY C. M. Avery
ATT'Y March 13, 1956

HANS-JOACHIM KLEINVOGEL ET AL 2,738,456

ELECTRIC CONTACT CONVERTERS

Filed Jan. 22, 1952

*Inventors*
HANS-JOACHIM KLEINVOGEL
FRITZ MÜLLER
BY C.M. Avery
ATT'Y

March 13, 1956

HANS-JOACHIM KLEINVOGEL ET AL 2,738,456

ELECTRIC CONTACT CONVERTERS

Filed Jan. 22, 1952

Inventor:
HANS-JOACHIM KLEINVOGEL
FRITZ MÜLLER
BY C. W. Avery
ATT'Y 2,738,456

ELECTRIC CONTACT CONVERTERS

Hans-Joachim Kleinvogel, Berlin-Siemensstadt, and Fritz Müller, Berlin-Marienfelde, Germany, assignors to Siemens-Schuckertwerke Aktiengesellschaft, Berlin-Siemensstadt, Germany, a corporation of Germany Application January 22, 1952, Serial No. 267,596

Claims priority, application Germany January 24, 1951

19 Claims. (Cl. 321—48)

Our invention relates to electric contact converters and particularly to multiphase converters with synchronous contact devices actuated by mechanical drive means.

In known converters of this type, a cam shaft driven by a synchronous motor controls the contact devices to close and open periodically in synchronism with the alternating current to be converted so that only current half waves of a given polarity can pass through each contact device to the output terminals or buses of the converter. Each contact device is controlled by the pertaining cams through a reciprocating tappet which runs idle during part of its stroke to engage and move the contact device against a spring bias during the proper portion of the cycle period.

Series connected with the contact devices of such converters are respective saturable commutation reactors. These reactors have an iron core of an approximately rectangular magnetization characteristics and are so dimensioned that the core is saturated at very small instantaneous current values. During the commutation intervals the reactor core becomes reversely magnetized so that the effective series reactance increases suddenly to a high value thus depressing the current magnitude to a slight residual value during an interval of time (step interval) in which the pertaining contact device is open. Taking the direction of the converter output current as positive, it is desirable to keep the residual current during the step intervals of the contact opening operation also at a positive value, several circuit schemes being known for this purpose.

The commutation intervals of such converters are dependent upon the degree of output control to which the converter is subjected as well as upon the magnitude of the converted output current. To make certain that the contact device will always open during the step interval regardless of the control condition of the converter and regardless of its load current, a relatively large commutating reactor is needed. It has also become known to phase displace the opening moments of the contact devices to thereby vary the interphase overlapping intervals of the contact closing periods (commutation intervals) in adaptation to the control condition of the converter or the magnitude of its load current. This permits giving the saturable commutating reactor a smaller size while having the contact opening moments always occur during the step intervals.

The devices heretofore available for adjusting or automatically regulating the commutation intervals operate, in principle, as if the length of the tappet acting upon the movable contact of each device is being varied. For instance, the eccentric cam acting upon the tappet has been given an axially elongated non-cylindrical shape and, for varying the commutation intervals, the cam has been displaced perpendicularly to the direction of tappet movement. According to another known design the tappets are actuated by a swing lever whose pivot axis is raised or lowered for changing the commutation intervals. All these devices, as mentioned, have in common that their control operation is equivalent to a lengthening or shortening of the cam tappet. In consequence, a variation of the commutation interval, i. e. of the opening moment of the contact device is accompanied by a simultaneous variation of the contact closing moment. For that reason, the control or regulation of the commutation interval in the known converters leaves much to be desired. For instance, if the converter is mechanically controlled for reducing its output voltage, the closing moment of the contacts is phase displaced a certain amount corresponding to the desired voltage, but then any regulation of the commutation intervals affects the closing moment by another phase modification that may not be in harmony with the desired voltage condition. The known regulation of the commutation intervals also causes a change in the current-voltage characteristic of the contact converter in such a manner that the characteristic is shallower in a comutation-regulated converter than in an unregulated converter.

It is therefore an object of our invention to eliminate these deficiencies and to devise a mechanically driven contact converter in which the commutation intervals can be adjusted or regulated without affecting the phase position of the contact closing moments.

Another object of our invention is to improve mechanically driven contact converters, especially for power purposes, toward a larger versatility of power ratings and uses available for the same manufactured apparatus, thus reducing the cost of such converters and facilitating their adaptation to a large variety of requirements.

According to our invention, we achieve the desired improved control and regulation by providing each individual phase circuit of a contact converter with two interconnected contact devices of mutually overlapping closing periods, one contact device (make device) acting to close the circuit and the other (break device) to open the circuit; and we make the closing period of the break device controllable relative to the closing period of the make device. This affords displacing the phase of the circuit opening moment without changing the phase position of the closing moment. As a result, the interphase commutation intervals of the converter can be varied independently of the recurrent phase moments at which the individual commutation circuits are closed.

Such an adjustment or regulation is applicable together with a mechanical partial control of the converter, i. e., a control of the converter output voltage or current by displacing the closing moment in the individual commutation circuits. The invention, however, is likewise applicable with a partial output control by means of a bias magnetization imposed upon the saturable commutation reactor at the closing moment. The invention is further applicable in converters not subjected to a partial control in which only the load current varies.

The two contact devices of each phase circuit may be connected in series or in parallel relation to each other. In either case one of the two contact devices operates as a make contact only. The closing period of this make contact is kept constant and its closing moment is either adjusted to a fixed phase position or it is shifted only for the purpose of output control. The other contact device operates only as a break contact and its closing period is variable in length, phase position, or both. For instance, in a cam-driven converter, the closing periods of the break contact is kept constant while the phase position of the pertaining cam is changed relative to the cam for the make contact. According to another possibility, the closing period of the break contact as well as the phase position of the pertaining drive cam relative to that of the make contact may be varied.

According to another feature of our invention, we compose a mechanically driven contact converter of a plurality of units each having its own frame structure on which one or more contact devices with pertaining drive mechanisms and a drive shaft are mounted to make each unit capable of being individually manufactured, tested and mechanically operated. We further join two or more of such units together, with their shafts extending parallel to each other, and we electrically interconnect the pertaining contact devices into a common multi-phase converter circuit. In accordance with another feature of our invention, two or more further units of the same design are joined in end-to-end relation with the shaft-parallel assembly of units so that one or more of the parallel shafts are disposed and connected in line with the shaft of another unit.

The foregoing and other objects, advantages and features of our invention will be apparent from, or will be mentioned in, the following description in conjunction with the embodiments of the invention exemplified by the drawings in which:

Figs. 1 to 9 are explanatory, showing in Fig. 1 a three-phase voltage diagram, and schematically representing in Figs. 2 to 9 respectively different commutation conditions as occurring in contact converters according to the invention;

Fig. 10 shows a schematical view of a contact converter according to the invention, and Fig. 11 a schematical and partial view of the same converter seen from the right of Fig. 10;

Fig. 12 is a part-sectional view of a modified cam shaft assembly for a converter otherwise in accordance with Figs. 10 and 11;

Figs. 13 to 16 illustrate schematically a converter with two cam shafts for the make contact devices and break contact devices respectively, Fig. 13 showing a side view and Fig. 14 a front view of the driving portion of the converter, while Fig. 15 shows some of the pertaining contact devices viewed from the front, and Fig. 16 is a partial top view of the converter;

Fig. 22 is a side view and Fig. 23 a top view of a two-unit converter composed of individual units according to Figs. 18 to 21;

Figure 27:
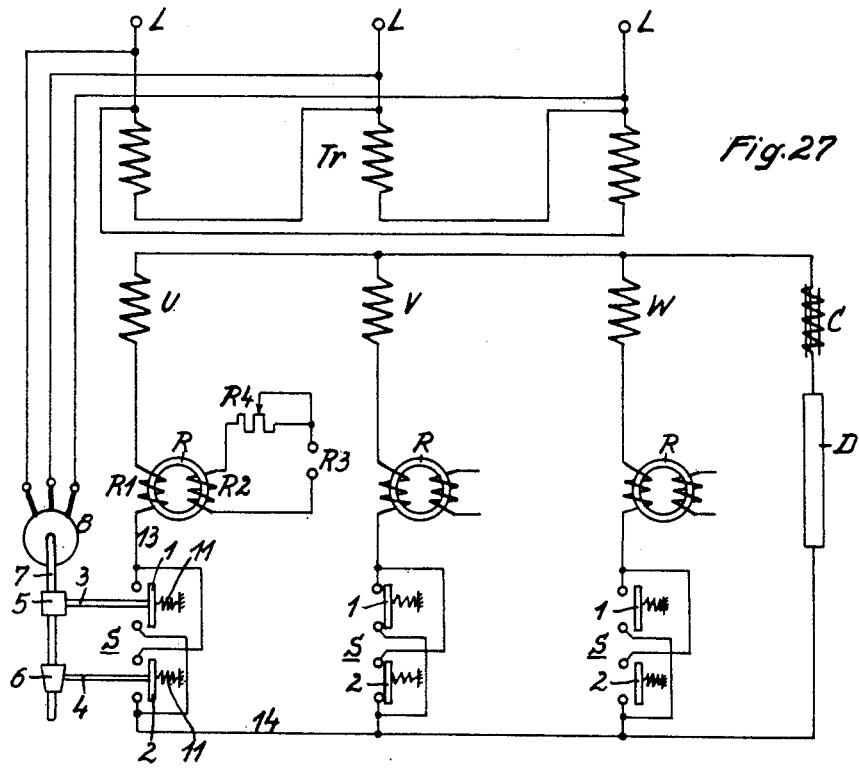
Figure 28:
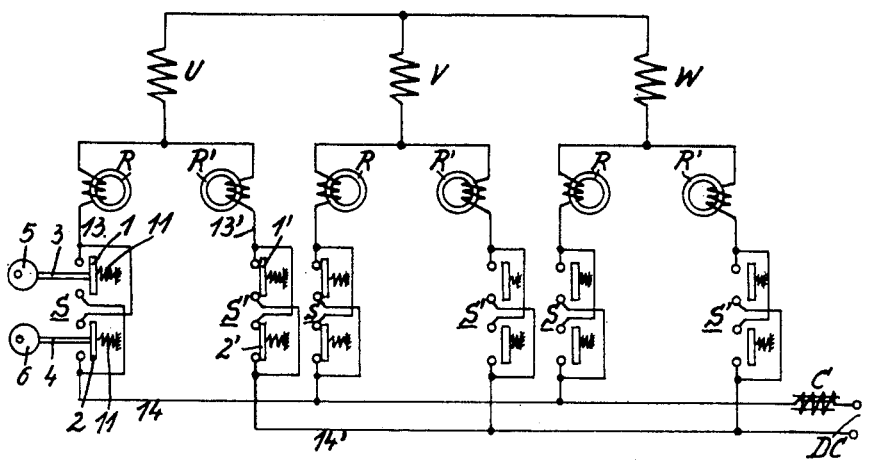
Figure 29:
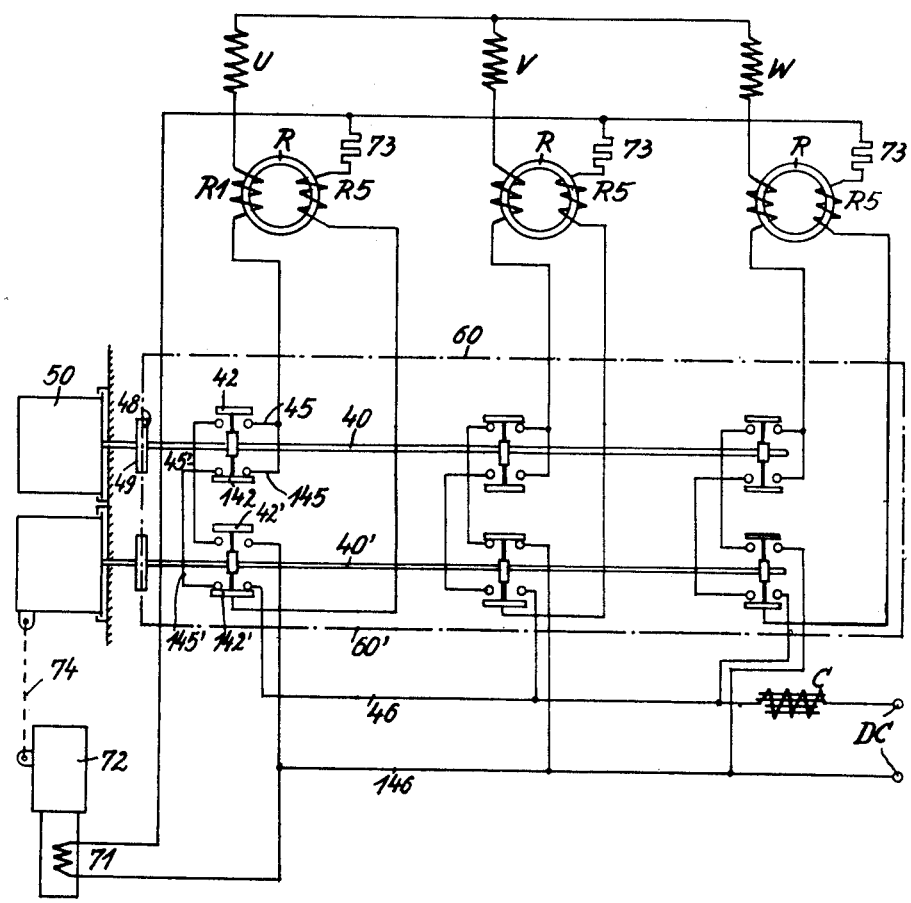

Figs. 24, 25, and 26 are respective side, front and top views of a four-unit converter also composed of units according to Figs. 18 to 21; and Figs. 27, 28, and 29 are respective schematic circuit diagrams of converters according to the invention.

Before dealing in detail with the structural aspects of converters according to the invention, reference will first be had to the schematic circuit diagrams of Figs. 27 to 29.

The converter circuit illustrated in Fig. 27 involves a three-phase Y-connection with three saturable commutating reactors and three switching places. The three commutation circuits of the converter are energized from respective secondaries U, V, W of a power transformer Tr whose input terminals L are to be connected to a three-phase alternating-current line. Each of the three commutation circuits has the main winding R1 of a saturable commutation reactor R series connected with a switching place S which comprises two contact devices 1 and 2. The output circuit of the converter includes a smoothing reactor C in series with the load D. During normal converter operation, the closing periods of the two contact devices in normal operation overlap so that both devices operate in effect like a single switch which opens and closes the pertaining commutation circuit in synchronism with the alternating current to be converted. Each device is mechanically driven, for instance as schematically illustrated, by respective reciprocating tappets 3 and 4 actuated by respective eccentric cams 5 and 6 whose cam shaft 7 is driven by a synchronous motor 8 energized from the line terminals L. The movable contact member of each device is biased by a spring 11 toward closing engagement with the pertaining stationary contacts so that each contact device is opened in opposition to its spring bias when the pertaining tappet 3 or 4, advancing toward the right of the illustration, abuts against the movable contact member.

In the circuit diagram of Fig. 27, the two contact devices 1 and 2 in each commutation circuit are connected parallel to each other. Assume that during each cycle of operation the contact device 1 closes earlier than the contact device 2. Then the commutation circuit is closed as soon as contact device 1 closes, and the circuit is interrupted by the contact device 2 which opens later than the contact device 1. Consequently the three contact devices 1 of the converter operate as circuit closing or make devices while the three contact devices 2 of the respective commutation circuits operate as circuit opening or break devices.

The saturable commutation reactor R in each commutation circuit is reversely magnetized during the commutation intervals. At that time the reactor core becomes unsaturated so that the reactor main winding R1 increases its reactance and thereby reduces the instantaneous current to a small residual value (step current) during an interval of time (step interval) within which the break contact may open the pertaining commutation circuit without arcing or sparking. Each reactor R is biased by a premagnetization in order to place the step interval into a desired relation to the zero passages of the current wave and/or to give the step current a desired small value of the preferred polarity which, as a rule, is positive, counting the rectified load current of the converter as positive. The premagnetization also serves to establish a desired condition of reactor magnetization at the circuit closing moments. Various auxiliary circuits are known for producing such a bias magnetization of the saturable commutation reactor. In Fig. 27, a bias winding R2 is schematically represented for the reactor R of the commutation circuit pertaining to the transformer winding U. The circuit of the auxiliary bias winding R2 is energized at terminals R3 from a suitable source of alternating or unidirectional bias voltage in series with a resistor R4. The bias circuit is shown only as a schematic example, it being understood that the reactors of the other commutation circuits are similarly equipped and that various other known bias circuits may be used instead. A further description and illustration of the bias circuits need not be given in this specification because these circuits and their particular design are not essential to the invention proper.

According to the invention, the closing interval of the make contact device 1 is kept unchanged during the operation of the converter, except in cases where a phase shift of this closing interval is introduced for the purpose of controlling the output voltage, current or power of the converter. However, the closing interval of the break device 2 is changed during the operation of the converter by correspondingly controlling the mechanical transmission or drive means that operate the contact device 2. This permits changing the closing and opening moments of the break device 2 relative to the closing and opening moments of the make device 1. As a result, the closing interval of each switching place S as a whole is lengthened or shortened, for instance, in order to adapt the operation of the converter to changes in the converter load current.

In the converter contact apparatus exemplified in Fig. 27, the just-mentioned commutation control is effected by the following means. The cams 5 and 6 are mounted on shaft 7 in a fixed angular position to each other. The shaft 7 is axially displaceable. Cam 5 is cylindric. Cam 6 is frusto-conical. Hence, when shaft 7 is axially displaced, by means described in a later place, the closing period of contact device 1 remains unchanged, while the closing period of device 2 is lengthened or shortened without change in the angular relation of the two cams.

The converter according to Fig. 28 involves a three-phase bridge connection for full-wave rectification with six reactors and six switching places, the primary windings of the power transformer and the drive motor being omitted. The phase circuit of transformer winding U has two branches each comprising in series a saturable commutation reactor R or R' and a switching place S or S' connected with the respective positive and negative buses 14 and 14' of the direct current load circuit which includes a smoothing reactor C and has terminals DC for connection to the load. Each switching place S or S' has two parallel-connected contact devices 1, 2 or 1', 2'. Contact devices 1 and 2 operate 180° phase displaced relative to devices 1' and 2' respectively.

The phase circuits of transformer windings V and W are similarly designed.

The contact devices 1 and 2 connected with the reactor R in the circuit of transformer winding U are shown to be driven by tappets 3 and 4 from respective cams 5 and 6. All other contact devices are operated by respective cams in a similar manner. The cam shaft or shafts are operated by a synchronous motor in synchronism with the alternating current. Cam 6 is phase-adjustable relative to cam 5 so that the closing interval of the switching device 2 (break device) can be shifted with respect to that of the make device 1. Any such variation is effected simultaneously for all six switching places of the converter.

Instead of connecting the two contact devices of each commutation circuit parallel to each other, they may also be connected in series. With such a series connection the first opening contact device interrupts the circuit and hence operates as the break device while the other, last closing contact device completes the circuit and operates as the make device.

The circuit diagram of Fig. 29 shows such as series connection in conjunction with a three-phase bridge connection of three reactors R and six switching places. Two switching places are connected in parallel branches of each reactor circuit, and each switching place comprises two series-connected contact devices such as those denoted by 42 and 42', or 142 and 142'. Contact devices 42 and 42' operate 180° phase displaced relative to respective contacts 142 and 142'. All make devices are driven from a cam shaft 40 and all break devices are driven from another cam shaft 40'. Both shafts operate simultaneously, cam shaft 40' being phase adjustable relative to shaft 40 for varying the interphase commutation intervals.

The circuit diagrams of Figs. 27 to 29 will again be referred to in later places where further details will be described. As will be explained more in detail, the two switching devices of each switching place in converters according to Figs. 27 to 29 may pertain to one and the same mechanical switching apparatus or they may be separated mechanically into a plurality of mechanisms or units. However, before further dealing with the mechanism features of the invention, an explanation will be given of the obtainable control or regulating performance.

The three sinsoidal waves $u$, $v$, $w$ shown in Fig. 1 represent the voltage curves of the three voltages of the respective transformer windings U, V and W in a three-phase converter circuit such as exemplified by Figs. 27 to 29.

The schematic illustrations of Figs. 2 to 9 are related to the time axis of the voltage curves shown in Fig. 1. In each of Figs. 2 through 9 the cross-hatched line or bar Tc represents the closing interval of the make device, while the bars T1 and T2 represent closing intervals of the break device pertaining to the same switching place.

Figs. 2 to 5 concern converters in which the relative position of the cams for the respective make and break devices remains unchanged while the length of the closing period of the break contact device is varied as explained above with reference to Fig. 27.

The conditions exemplified by Fig. 2 are peculiar to a series connection of the two contact devices pertaining to the same switching place (see Fig. 29). According to Fig. 2 the closing period Tc of the make device amounts to 180° (electrical). The fixed phase difference between the respective drive cams of break device and make device is minus 30°. The minus designation is used to indicate that the cam of the break device leads the cam of the make device. That is, when the closing period of break device and make device are made equal, the break device opens and closes 30° earlier than the make device. By varying the length of the closing period of the break device, the commutation intervals of the converter can be adjusted to any value within the two extreme theoretical limits explained presently.

Assume that the closing period of the break device is adjusted to its minimum $T1 = 120°$ (Fig. 2). Then the closing periods Tc and T1 of the respective make device and break device start simultaneously at the moment $T_0$, and the pertaining phase circuit is closed at that moment. The break device, series-connected with the make device, opens at the moment $t_{120}$ and interrupts the phase circuit. Hence the effective closing period of the switching place is 120°. The switching place in the next sequential phase circuit closes that circuit at the same moment $t_{120}$. Consequently, this adjustment would secure an interphase commutation interval of 0°.

Now assume that the closing period of the break device is changed to its maximum length $T2 = 240°$ (Fig. 2). Then the make contact closes at the moment $t_0$ as before, and the break contact opens at $t_{180}$ so that the total closing period of the switching plate is 180° while the commutation overlap with the incipient phase is 60°.

Consequently, the interphase commutation intervals can be varied between the limit values of 0° and 60°. This change is effected by shifting the break moment between $t_{120}$ and $t_{180}$ without changing the make moment $t_0$.

If the interphase overlap control is also to be used for starting the converter, the closing periods of two switching places in immediately sequential phase circuit must be so adjusted that they do not overlap thus excluding the possibility of arcback. Then the full alternating voltage can be placed upon the converter without necessity of using separate starting devices. For this purpose, therefore, it is necessary in converters according to the invention to provide the possibility of temporarily regulating the overlap interval below zero degrees. To this end, for instance, the phase displacement between the cams for the make and break devices may be selected somewhat larger, for instance at minus 35°. The largest closing period of the break contact device would then amount to 250° and the shortest closing period of the same contact device would be 110°, thus permitting an adjustment of the interphase overlap interval between minus 10° and plus 60°.

Fig. 3 represents an example of conditions for a converter with parallel-connected make and break devices (see Fig. 27). The contact period Tc of the make device is 120°. The fixed phase displacement between the contact closing periods of the make and break devices for equal durations of the two intervals is plus 30°. The closing interval of the break device is adjustable between $T1 = 60°$ and $T2 = 180°$.

The phase circuit is closed at the starting moment $t_0$ of the period Tc. At the moment $t_{60}$ the parallel-connected break contact also closes and the period T1 starts running, but this has no effect on the phase circuit. At the moment $t_{120}$ both devices open. Hence, the closing period of the switching place is 120° and the commutation or interphase overlap interval is 0°. When the break device is adjusted to its maximum closing period T2, the total closing period of the switching place is 180° and the interphase overlap is 60°. It will be recognized that with parallel-connected contact devices according to Fig. 3 the same operating limits are obtained as with series connected devices according to Fig. 2.

If under the conditions of Fig. 3 the control is to be utilized for starting the converter, the angle of phase displacement of the two eccentric cams may be made somewhat smaller, for instance plus 25°, and the closing period of the make contact device may be chosen at 180°. Then the longest closing period of the break contact is 170° and the shortest period is 50°, and the interphase overlap interval may be adjusted to any value between minus 10° and plus 50°.

A regulation of the overlap intervals as described above with reference to Figs. 2 and 3 is sufficient for contact converters in a three-reactor connection (see Figs. 27 and 29). For contact rectifiers with a six-reactor connection (see Fig. 28) a range of overlap variation larger than 60° is required. A range of about 110° being generally not exceeded.

For an overlap larger than 60°, the contact closing intervals may be chosen, for instance, as represented in Fig. 4 for a series connection of the two contact devices. The make device has a closing period Tc of 240°. The closing period of the break contact device is variable between T1=120° and T2=360°, the phase displacement of the two drive cams being minus 60°. The overlap or commutation interval can be adjusted between 0° and 120°. If it is desired to start the variation from minus 10°, as may be desired for starting the converter, the phase displacement may be chosen as minus 65° and the closing period of the break device may be varied between 110° and 350° thus resulting in an overlap between minus 10° and plus 110°.

Fig. 5 elucidates similar conditions for parallel connected contact devices. The closing period of the make device amounts to Tc=120°. The closing period of the break device is variable between T1=0° and T2=240°, the phase angle between the cams being 60°. The overlap interval is adjustable between 0° and 120°. If it is desired to change the overlapping interval between minus 10° and plus 110°, the closing period of the make contact may be chosen 110° with a phase displacement of 55° between the cams, and a range of 0° to 220° for the closing period of the break contact.

In connection with the examples of overlap variation described in the foregoing as well as in the following (Figs. 2 to 9), it will be understood that any particular converter operation demands certain conditions with respect to the velocity of the opening and closing movement of the switching contacts, and that for any given structural design of the converting apparatus certain limitations are imposed upon the deflection of the contact closing springs. Consequently, it will not always be possible to utilize the indicated full range for the overlap regulation. Hence, the examples here discussed represent theoretical limits, while it will be evident that, for instance, a contact closing period equal to 0° or 360° will practically not be applicable. However, the examples show that converters according to the invention can readily be adapted to an extreme variety of different conditions by suitably selecting the contact closing periods for the make and break devices and by suitably selecting the phase displacement between the pertaining control cams depending upon the conditions of each particular application.

As mentioned in conjunction with Figs. 28 and 29, the closing period of the break contact may be kept at a constant length and the phase position of the pertaining control cam may be shifted relative to the control cam of the make device. The operating conditions thus obtainable are exemplified by Figs. 6 to 9. Figs. 6 and 7 relate to two different cases of parallel connected contact devices.

According to Fig. 6, the closing period Tc of the make contact is 180° and the closing period T1 (or T2) of the break contact is likewise 180°. The phase position of the drive cam for the break contact is varied from 0° to 280° relative to the cam of the make contact so that a variation in the interphase overlap interval of 60° to 240° will result. In the case represented by Fig. 6, the closing interval of the make contact is equal to the opening interval of the same contact, and the same conditions apply to the break contact. This permits obtaining especially favorable conditions as regards the switching velocity and the deflection of the contact springs.

In the case represented by Fig. 7, the same contact closing period of 120° is chosen for both contact devices, and the drive cam of the break contact is phase displaceable 0° to 220° relative to the cam of the make contact. The overlap interval can be regulated from 0° to 120°. If, for instance, a regulation of the overlap interval from minus 10° to plus 100° is desired, the closing period of both contacts may be made 110° and the maximum phase displacement between the cams likewise 110°.

Figs. 8 and 9 relate to a series connection of the two contact devices. According to Fig. 8 the respective opening and closing periods of the make and break devices are equal to 180°. When the drive cam for the break contact is phase shifted from minus 180° to 0° relative to the cam for the make device, a variation in the overlapping interval from minus 120° to plus 60° is obtained. Such a converter offers favorable conditions as regards contact velocity and spring deflection and, by virtue of the large range of overlap variation, is suitable, for instance, for a three-reactor connection with an overlap range between minus 10° to plus 60°.

According to Fig. 9, the contact closing periods are increased to 240° and the phase difference between the cams is varied from minus 120° to 0°. Consequently, the overlapping interval can be regulated from 0° to 220°. If the conditions are somewhat modified, for instance if the contact closing period of each contact is made 220° and if the phase position of the cam for the break contact is shifted between 0° and 110°, then an overlap range from minus 10° to plus 100° is obtained. Such a converter, is well suitable, for instance, for converters in six-reactor connection.

Embodiments of mechanical apparatus for converters according to the invention will now be described more in detail.

The converter apparatus according to Figs. 10 and 11 is equipped with cam controlled tappets for mechanically actuating the converter contacts. The relative position of the two cams for the make and break contacts of each switching place S or S' is constant, while the length of the closing period for the break contact is varied in accordance with the operations explained previously in conjunction with Figs. 2 to 5.

In the embodiment of Figs. 10 and 11, the make and break contacts for each switching place are connected parallel to each other as explained with reference to the circuit diagrams of Figs. 27 and 28. More particularly, the converting apparatus is designed for operation with six switching places S and S' as exemplified by the circuit diagram of Fig. 28 in which the elements of the contact apparatus are denoted by the same respective numerals as in Figs. 10 and 11. It will be understood that a converting apparatus according to Figs. 10 and 11 may also be used with a series connection of the make and break contacts, a corresponding modification of the circuit connections for the contacts being then required.

As shown in Fig. 10, the make contacts 1 or 1' and the break contacts 2 or 2' are actuated by respective reciprocating tappets 3, 4 and 3', 4' which are driven by eccentric cams 5 and 6 respectively. The cams are firmly mounted on the pertaining cam shaft 7 which is driven by a synchronous motor 8. Cam 5 is cylindrical. Cam 6 departs from the cylindrical shape and may be given a frusto-conical design. Cam shaft 7 is connected with motor 8 by a coupling sleeve 9 firmly joined with the motor shaft. Sleeve 9 has two opposite slots parallel to the shaft axis which are engaged by a cross pin 10 of shaft 7. Consequently, shaft 7 is displaceable in its axial direction. Lifting and lowering of shaft 7 causes the tappets 4 and 4' to engage the non-cylindrical cam 6 at respectively different cam diameters. As a result, the closing periods of the break contacts 2 and 2' are changed accordingly. The closing intervals of make contacts 1 and 1', however, are not affected by the shaft displacement. Shaft 7 has its lower end in engagement with an eccentric 12 mounted on a control shaft 12'. Shaft 12' can be adjusted to any desired angular position, either by manual means or automatically by a condition-responsive regulator, thereby controlling the commutation intervals or interphase overlap in the manner explained previously.

For controlling or regulating the output voltage, current or power of the converter, the stator of the synchronous motor 8 is angularly adjustable with respect to its stationary supporting structure. To this end, the housing of the motor has a member 8' to be actuated manually or by suitable automatic means. However, a similar control of the converter output may also be obtained with a fixed stator if the motor is energized through a phase shift transformer. The alternating-current buses of the converter are denoted by 13, 13', while 14 denotes one of the direct-current buses in accordance with the circuit diagram of Fig. 28.

The apparatus is equipped with three pairs of cams 5, 6, each actuating two contacts disposed at diametrically opposite sides of the cam shaft. It will be understood that for a converter with only three switching places, as exemplified by Fig. 27, only three pairs of contacts are needed all located at the same side of the cam shaft.

If the closing periods of the break contacts are to be kept constant while the angular position of the pertaining cams are to be changed relative to the cams of the make contacts as is the case for the operations explained with reference to Figs. 6 to 9, the converting apparatus may be modified in accordance with Fig. 12.

According to Fig. 12, the apparatus, otherwise similar to that of Figs. 10 and 11, has its cam shaft 7 equipped with two cams 15, 16 for the contacts of each pair of switching places. Cam 15 operates the tappets 3 and 3' for actuating the respective two make contacts while cam 16 actuates the tappets for the respective break contacts. The two cams 15 and 16, which may both consist of cylindrical eccentrics, are loosely seated on shaft 7. The shaft has for each cam a coupling pin 17 or 18. The pins engage respective slots of the two cams. The slot 19 of cam 15 for the make contact is straight and parallel to the shaft axis. The slot 20 of cam 16 for the break contact departs from a straight line, being, for instance, curved along a helix about the shaft axis. When the cam shaft 7 is lifted, cam 16 is turned relative to cam 15 thereby displacing the phase position of the contact closing period of the break contacts without changing the length of this period.

The phase angle between the two eccentric cams for the make and break contacts of each switching place may also be controlled by providing the apparatus with two cam shafts. The embodiment illustrated in Figs. 13 through 16 is designed in this manner. The apparatus has two cam shafts 21 and 22. The cams 23 on shaft 21 actuate the make contacts 1 and 1'. The cams on shaft 22 actuate the break contacts 2 and 2'. In this embodiment the make and break contacts of each switching place are connected in series with each other. This is apparent from Fig. 15 in which the alternating-current buses are denoted by 25 and the direct-current buses by 26.

The cam shaft 21 is driven by a synchronous motor 27. Shaft 22 is driven by a separate synchronous motor 28. The stators of both motors are revolvably mounted, and both motors are energized from the alternating-current line feeding the converter so that the motors operate in synchronism with the current cycle. The adjustment or regulation of the commutation intervals is effected by turning the stator motor 28. An adjustment or control of the output voltage, current or power can be effected by also turning the stator of motor 27. Instead, both motors may be energized through a phase shift transformer (not shown). In the latter case the range of overlap regulation may be kept smaller than otherwise necessary. That is, the angular displacement range of the stator of motor 28, without energization through a phase shift transformer, must be equal to the sum of the angle needed for the partial control (voltage, current or power control) plus the angle needed for varying the commutation interval; but when a phase shift transformer is used the range of angular displacement may be limited to the angle required for controlling or regulating the commutation interval.

Figure 14:
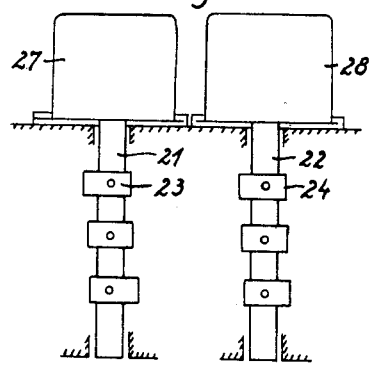
Figure 13:
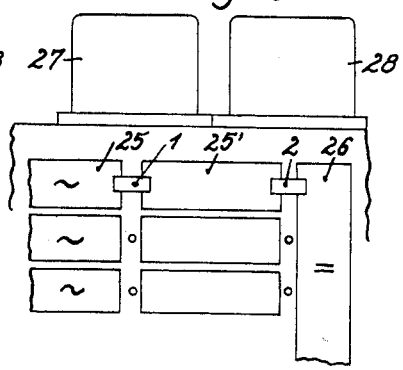

For connection to output or commutation regulators, the housing of motors 27 and 28 are shown to be equipped with respective connecting members 29 and 30 (Figs. 13, 16).

Figure 17:
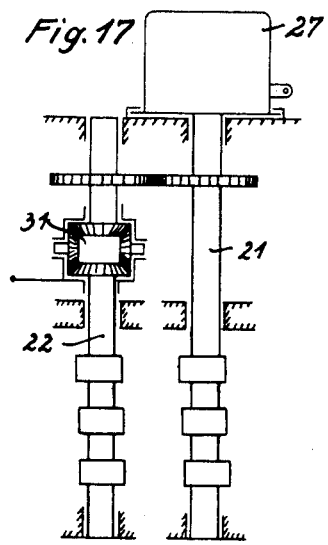
Fig. 17 shows schematically a modified portion of a two-shaft converter otherwise similar to the converter according to Figs. 13 to 16.

Another possibility according to the invention of controlling the phase angle between the respective cams for the make and break contacts is represented in Fig. 17. As shown, the cam shaft 21 for the make contacts is directly driven from the motor 27 while the cam shaft 22 for the break contacts is indirectly driven from the same motor 27 through a differential gearing 31. For varying the commutation intervals, the differential gear is adjusted by turning the axis of its intermediate gear members a corresponding angular amount about the axis of shaft 22, thus changing the relative phase position of the two cam shafts accordingly.

The control of the commutation intervals may be effected manually when the voltage or current of the contact converter is adjusted manually by partial control. However, the commutation intervals may also be regulated automatically in contact converters whose output control is effected manually or automatically. The regulator for varying the commutation interval may be made dependent upon the load current or, for instance, it may be dependent upon the time integral of the voltage across the saturable reactor which produces the step interval explained in the foregoing. An example of such an automatic regulation will be described in a later place with reference to Fig. 29.

In contact converters with two shafts for controlling the make contacts and break contacts respectively, the design of the converting apparatus may be improved or simplified by composing it of two similar base units which are mounted together to form an entity, each unit comprising one drive shaft, one or more contact devices with the pertaining tappets or other mechanisms, and a frame structure on which the shaft, tappets and contacts are mounted.

Figure 18:
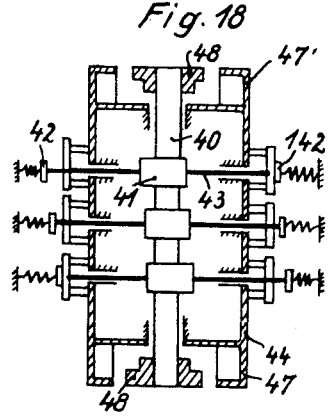
Fig. 18 is a sectional view, Fig. 19 a front view and Fig. 20 a part-sectional top view of an individual converter unit whose upper portion is separately illustrated in Fig. 21 in conjunction with a pertaining drive motor.
Figure 19:
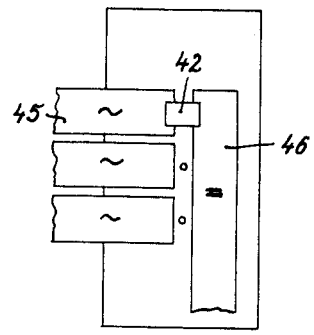
Figure 20:
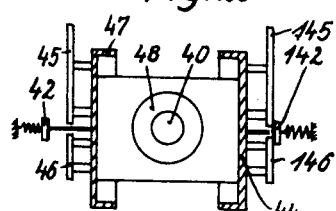

Such a converter unit is shown in Figs. 18 to 20. The unit has a cam shaft 40 with eccentric cams 41, movable contacts 42, 142 and pertaining tappets 43, all mounted on a frame structure 44 which also carries the stationary contacts to cooperate with the movable contacts. In the illustrated example, the stationary contacts consist of alternating-current buses 45, 145 and direct-current buses 46, 146. The frame structure 44 has at each axial end a mounting flange 47.

The flanges 47 may be integral with the frame structure, or they may be fastened thereto by screws, rivets or the like. The cam shaft 40, in the illustrated embodiment, projects axially beyond its bearings and carries at each end a coupling member 48 for connection to a drive motor or to the cam shaft of an adjoining converter unit.

Figure 21:
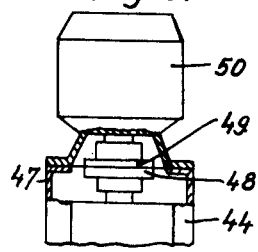

Fig. 21 shows a synchronous motor 50 whose shaft has a coupling member 49 connected with one of the coupling members 48 of the unit. The motor housing is secured to the mounting flange 47 of the unit, and the mounting may be such that the motor housing can be angularly displaced relative to the frame structure of the unit.

Two converter units may be joined together in side-by-side relation so that the axes of the respective cam shafts are parallel. Such a composite converter is illustrated in Figs. 22 and 23 where the two interconnected converter units are denoted by 60 and 60'. As far as the elements shown in Figs. 22 and 23 are identical with those of Figs. 18 through 21 they are denoted by the same respective reference characters, except that a prime is added to the elements of the converter unit 60'.

As schematically shown, the coupling flanges 47 and 47' are secured to each other by screws 51. The contacts 42 of unit 60 and the contacts 42' of unit 60' are electrically series connected so that each switching place comprises a contact 42 of unit 60 to function as the make contact and a contact 42' of unit 60' to function as a break contact. This connection corresponds to the circuit diagram of Fig. 29 in which the corresponding elements of the converting apparatus are denoted by the same respective reference characters. The alternating-current buses are shown at 45, 45', 145, 145' and the direct current buses at 46 and 146. Connected with each converter unit is a synchronous motor 50 or 50' whose stator is revolvably adjustable with respect to the pertaining frame structure. By turning the stator of motor 50, the output voltage, current or power may be controlled (mechanical partical control). By turning the stator of motor 50' the commutation intervals are controlled or regulated in the manner explained previously.

As mentioned, the output control may also be effected by means of a phase shift transformer energizing the motor 50 or both motors.

While in the embodiments of Figs. 18 through 23 the make and break contacts are series connected, an otherwise similar design and composition of the converter from similar individual units is also applicable with a parallel connection of the contacts of each switching place. It will also be obvious that circuit connections other than that of Fig. 29 may be used, for instance a three-phase bridge connection with six reactors (see Fig. 28).

A contact converter composed of similar units according to the invention may also be used for a variety of circuit connections and purposes not necessarily involving a control and regulation of the commutation intervals. Generally, such a multiple unit design is favorably applicable with any contact converter having drive shafts for mechanically actuated contacts.

For instance, one of the outstanding purposes and advantages of such a multiple-unit design is the fact that it permits providing a variety of converters for largely different voltage, current or power requirements merely by selecting and interconnecting a proper number of units, all having the same construction and similar individual parts. For instance, relating to a converter according to Figs. 18 through 23 and 29, the rated power output of the converter may be doubled by joining with each unit of the converter an additional unit in such a manner that the respective cam shafts are aligned and connected with each other. The resulting apparatus has a total of four units, each two units having aligned shafts extending parallel to the shafts of the other two units. The contacts of the two pairs of units whose axes are parallel are then electrically interconnected to serve as make and break contacts for the same respective switching places. For instance, if each unit has six contacts as is the case in the embodiments of Figs. 18 to 21, the two parallel pairs of units may be operated, for instance, in a three-phase bridge connection with three or six reactors (see Figs. 28 and 29 respectively) and these contacts may be connected with the corresponding two other converter units in series or parallel relation. The control or regulation of the commutation intervals is effected by varying the phase position of the two aligned cam shafts relative to the other two cam shafts.

An embodiment of the just-mentioned kind is represented in Figs. 24 to 26. The converter units 60 and 60' correspond to the units 60 and 60' of Figs. 22 and 23. Aligned with unit 60 is a similar unit 160. Still another unit 160', also of the same design, is joined with unit 60'. The aligned cam shafts of units 60 and 160 are connected with each other by coupling flanges 48 and 148, and the cam shafts of units 60' and 160' are similarly joined. The coupling flanges 47 and 147 of the aligned units are firmly connected with each other, for instance, by screws as schematically indicated in Fig. 24. Consequently, the four units, when assembled, form a single converting apparatus. The control and regulation of the apparatus is effected in the same manner as described previously. It will be understood that the circuit diagram for this apparatus may be identical with that of Fig. 29, except that all contacts are duplicated in order to increase the voltage or current rating of the converter.

If desired, more than two pairs of similar converter units may be mounted together to result in an apparatus with two parallel cam shaft axes in which a row of aligned units may have any desired number of units depending upon the requirements of the particular application. While the described embodiments of the multiple-unit apparatus have one cam shaft, three pairs of contacts and six tappets mounted on the frame structure of the unit, a larger or smaller number of contacts and a correspondingly different number of tappets may be provided for each unit.

As mentioned in the foregoing, the variation of the commutation intervals may be effected by condition responsive control means. An example of each means is illustrated in Fig. 29. As shown, the saturable commutation reactor R in each phase circuit has a secondary coil R5. Connected across each coil R5 is the control coil 71 of a commutation regulator 72 of known type in series with a current limiting resistor 73, one resistor 73 being provided for each reactor coil R5. The output member of the regulator 72 is connected with the revolvably mounted stator housing of motor 50' by a mechanical link schematically represented at 74. The commutation regulator 72 responds to the time integral of the voltage at the commutating reactor from the beginning of the reversal in magnetization of the reactor to the opening moment of the break contact 142'. The regulator 72 therefore tends to maintain the just-mentioned time integral of the reactor voltage at a constant value and displaces the phase position of the opening moment of the break contact so that this moment occurs always at a desired phase point, for instance, in the middle of the step interval produced by the reactor.

While in the foregoing embodiments, cams are used for actuating the converter contacts through respective tappets, the commutation control features of the invention are not limited to this particular design but are generally applicable in converters with mechanically actuated contact devices.

It will be obvious to those skilled in the art upon a study of this disclosure that converters according to the invention may be modified in various respects and may be embodied in apparatus and circuit connections other than those specifically described, without departing from the essence of our invention and within the scope of the claims annexed hereto.

We claim:

1. An electric contact converter for producing D.-C. from an A.-C. supply, comprising a plurality of mutually phase displaced commutation circuits, two periodically actuated contact devices of mutually overlapping closing periods connected with each other in each of said circuits for respectively closing and opening said circuit, said two contact devices having respective drive means synchronous with the current in said circuit for actuating said contact devices sequentially and repeatedly in synchronism with the A.-C. frequency, one of said contact devices having a normally constant closing period of a given phase relation to said current, said other contact device having a closing period variable relative to said constant period, and control means operatively connected with said drive means of said other contact device for continuously controlling said variable period, said drive means of said one contact device being independent of said control means.

2. An electric contact converter for providing D.-C. from an A.-C. supply, comprising a plurality of mutually phase displaced commutation circuits, two periodically actuated contact devices of mutually overlapping closing periods connected with each other in each of said circuits for respectively closing and opening said circuit, synchronous drive means mechanically linked with said respective contact devices for actuating them sequentially and repeatedly in synchronism with the current to be converted, one of said devices in each circuit having a constant closing period, said other device having a closing period variable relative to said closing period of said one device to thereby vary the interphase commutation intervals of said circuits, and said drive means of said other device having continuously controllable control means operable during converter operation for controlling said variable closing period, said drive means of said one device being independent of said control means.

3. An electric contact converter for producing D.-C. from an A.-C. supply, comprising a plurality of mutually phase displaced commutation circuits, two periodically actuated contact devices of mutually overlapping closing periods connected with each other in each of said circuits for respectively closing and opening said circuit, said two contact devices having drive means synchronous with the current in said circuit and comprising two cams in actuating relation with said two contact devices for actuating said contact devices sequentially and repeatedly in synchronism with the A.-C. frequency, one of said cams having a cam contour displaceable relative to that of said other cam, and continuously adjustable control means joined only with said one of said cams for displacing its cam contour to thereby vary the interphase commutation intervals of said circuits.

4. An electric contact converter for producing D.-C. from an A.-C. supply, comprising a plurality of mutually phase displaced commutation circuits, two periodically actuated contact devices of mutually overlapping closing periods series connected with each other in each of said circuits for respectively opening and closing said circuit, drive means synchronous with the current to be converted and comprising two cams in actuating relation with said respective contact devices for actuating said contact devices sequentially and repeatedly in synchronism with the A.-C. frequency, one of said cams being continuously controllable relative to the other, and cam control means connected with said one cam for varying the closing period of one of said contact devices relative to the closing period of the other contact device of the same commutation circuit to thereby vary the interphase commutation intervals of said circuits.

5. In an electric contact converter according to claim 1, said two contact devices being parallel connected with each other so that the last opening contact device opens said circuit and the first closing contact closes said circuit.

6. In a converter according to claim 3, said two cams having a fixed phase position relative to each other, respective tappet means disposed between said cams and said respective contact devices, said one cam having a variable cam configuration controllable by said control means to vary the length of the closing period of said one contact device.

7. An electric contact converter for producing D.-C. from an A.-C. supply, comprising a plurality of mutually phase displaced commutation circuits, two periodically actuated contact devices connected with each other in each of said circuits to respectively close and open said circuit and having mutually overlapping contact closing periods of respective constant lengths, drive means synchronous with the current in said circuit and comprising two cams in actuating relation with said two contact devices for actuating said contact devices sequentially and repeatedly in synchronism with the A.-C. frequency, one of said cams being continuously phase displaceable relative to the other cam for phase shifting said closing periods relative to each other, and control means connected with said one cam for phase displacing it during converter operation.

8. In a converter according to claim 7, each of said two contact devices having closing and opening periods of equal length.

9. In a converter according to claim 3, said two cams having a common shaft and being mounted on said shaft in a fixed angular position relative to each other, one of said cams being cylindrical, said other cam being non-cylindrical, said shaft being axially displaceable to thereby vary the length of the closing period of said contact device pertaining to said other cam, and said control means being engageable with said shaft for imparting displacement to said shaft.

10. In a converter according to claim 3, said two cams having a common shaft and being mounted on said shaft in a variable angular relation to each other, said shaft being axially displaceable, a pin-and-slot connection joining said shaft with one of said cams and having a slot slanted relative to the shaft axis so that axial shaft displacement causes said one cam to change its angular position relative to the other cam, and said control means being engageable with said shaft for imparting displacement to said shaft.

11. An electric contact converter for producing D.-C. from an A.-C. supply, comprising a plurality of mutually phase displaced commutation circuits, two periodically actuated contact devices of mutually overlapping closing periods connected with each other in each of said circuits for respectively closing and opening said circuit, two drive means connected with said respective devices for actuating said contact devices sequentially and repeatedly in synchronism with the A.-C. frequency, one of said drive means having continuously adjustable phase shift means for phase displacing it relative to the other drive, and condition-responsive control means connected with one of said circuits to respond to an operating condition thereof and connected with said phase shift means for controlling the latter.

12. An electric contact converter for producing D.-C. from an A.-C. supply, comprising a plurality of mutually phase displaced commutation circuits, two periodically actuated contact devices of mutually overlapping closing periods connected with each other in each of said circuits mechanisms actuatingly engageable with said respective devices and having respective drive shafts and synchronous motor means connected with said shafts for operating them sequentially and repeatedly in synchronism with the current to be converted, and continuously adjustable phase shift means connected with one of said motors for phase displacing one of said shafts relative to the other.

13. An electric contact converter for producing D.-C. from an A.-C. supply, comprising a plurality of mutually phase displaced commutation circuits, two periodically actuated contact devices of mutually overlapping closing periods connected with each other in each of said circuits for respectively closing and opening said circuit, two cam drives having tappets engageable with said respective devices and having respective cams in driving engagement with said tappets, two parallel cam shafts on which said respective cams are mounted, two synchronous motors drivingly connected with said respective shafts for actuating said contact devices sequentially and repeatedly in synchronism with the A.-C. frequency, and continuously adjustable phase-shift means connected with one of said motors for phase displacing one of said shafts relative to the other to vary the interphase commutation intervals of said circuits.

14. An electric contact converter for producing D.-C. from an A.-C. supply, comprising a plurality of similar converter units, each unit having a frame structure and having periodic contact means and a contact control mechanism mounted on said structure for actuating said contact means sequentially and repeatedly in synchronism with the A.-C. frequency, said mechanism of each unit having a cam shaft and tappet means linking said cam shaft with said contact means, said frame structures of said converter units being firmly joined together in side-by-side relation to each other and having said respective cam shafts extending parallel to each other, and a plural-phase converter circuit extending through said contact means of said respective units, the respective contact means of a pair of side-by-side units being operative to sequentially switch in and switch out, respectively, the phases of said converter circuit.

15. An electric contact converter for producing D.-C. from an A.-C. supply, comprising a plurality of similar converter units, each unit having a frame structure and having periodic contact means and a contact control mechanism mounted on said structure for actuating said contact means sequentially and repeatedly in synchronism with the A.-C. frequency, said mechanism of each unit having a cam shaft and tappet means linking said cam shaft with said contact means, said frame structures of said converter units being firmly joined together in side-by-side relation to each other and having said respective cam shafts extending parallel to each other, a converter circuit having a plurality of phase-different commutation circuits, one contact means of one of said units being mounted with one contact means of another one of said units in each of said respective commutation circuits and having overlapping contact closing periods so that the contact means of said respective two units close and open respectively said commutation circuits, two motors connected with said respective two cam shafts, and continuously adjustable phase shift means connected with said motor pertaining to said circuit-opening unit for phase displacing the pertaining shaft relative to the other shaft.

16. A converter according to claim 14, comprising additional converter units similar to those joined side-by-side and firmly connected therewith, said additional units having their respective cam shafts aligned and connected with said respective parallel shafts, and said contact means of said additional units being also connected in said converter circuit.

17. In a converter according to claim 14, said converter unit having three pairs of contact devices, three pairs of pertaining tappets, and a single cam shaft for actuating said tappets, all mounted on said frame structure.

18. An electric contact converter for producing D.-C. from an A.-C. supply, comprising a plurality of mutually phase displaced commutation circuits, two periodically actuated contact devices of mutually overlapping closing periods connected with each other in each of said circuits for respectively closing and opening said circuit, two cam drives having tappets engageable with said respective devices and having respective cams in driving engagement with said tappets, two parallel cam shafts on which said respective cams are mounted, two synchronous motors drivingly connected with said respective shafts for actuating said contact means sequentially and repeatedly in synchronism with the A.-C. frequency, one of said motors having an angularly displaceable stator for phase displacing one of said shafts relative to the other to continuously vary the interphase commutation intervals of said circuits.

19. An electric contact converter, comprising a plurality of phase-different commutation circuits, two periodic contact devices of mutually overlapping closing periods connected with each other in each of said circuits for respectively closing and opening said circuit, two cam drives having tappets engageable with said respective devices and having respective cams in driving engagement with said tappets, two parallel cam shafts on which said respective cams are mounted, a synchronous motor drivingly connected with one of said shafts, and a differential gearing connecting said motor with said other shaft and having an intermediate gear shaft displaceable for shifting the phase position of said other shaft relative to said one shaft to thereby vary the interphase commutation intervals of said circuits.

References Cited in the file of this patent

UNITED STATES PATENTS

| | | |
|---|---|---|
| 1,760,966 | Schmidt | June 3, 1930 |
| 2,157,858 | Miller | May 9, 1939 |
| 2,227,937 | Koppelmann | Jan. 7, 1941 |
| 2,276,784 | Koppelmann | Mar. 17, 1942 |
| 2,298,130 | Janetschke | Oct. 6, 1942 |